United States Patent [19]

Pietzsch

[11] Patent Number: 4,892,656

[45] Date of Patent: Jan. 9, 1990

[54] VACUUM FILTER WITH RELEASABLY CLAMPED SEALING STRIP

[75] Inventor: Kurt E. Pietzsch, Wiesbaden-Sonnenberg, Fed. Rep. of Germany

[73] Assignee: Dorr-Oliver Incorporated, Milford, Conn.

[21] Appl. No.: 314,613

[22] Filed: Feb. 23, 1989

[51] Int. Cl.$^4$ .................. B01D 33/26; B01D 33/32
[52] U.S. Cl. ........................ 210/232; 210/344; 210/404; 210/406; 209/406; 162/357
[58] Field of Search ............... 55/490, 502; 210/161, 210/232, 236, 238, 326, 402, 404, 406; 162/357; 209/270, 288, 405, 406, 407, 272, 307, 350

[56] References Cited

U.S. PATENT DOCUMENTS

| | | | |
|---|---|---|---|
| 2,289,411 | 7/1942 | Derhard et al. | 210/404 |
| 2,710,693 | 6/1955 | Manley et al. | 210/404 |
| 2,793,755 | 5/1957 | Richards | 210/404 |
| 3,036,354 | 5/1962 | De Bie | 210/404 |
| 3,175,691 | 3/1965 | Watson | 210/404 |
| 3,229,815 | 1/1966 | Mathewson | 209/406 |
| 3,353,675 | 11/1967 | Glos, II | 210/404 |
| 4,123,362 | 10/1978 | Mansouri | 210/232 |
| 4,276,169 | 6/1981 | Browne et al. | 210/404 |

Primary Examiner—Richard V. Fisher
Assistant Examiner—Wanda L. Millard
Attorney, Agent, or Firm—Harold M. Snyder

[57] ABSTRACT

A vacuum filter for the separation of solids from liquids, comprising an endlessly circulating array of troughs which constitute a common horizontal filter surface, on which an endless filter cloth is laid, in which each trough has an elastic sealing strip on that rimless edge which extends along the trough bottom transversely to the direction of movement. A good vacuum seal between two successive troughs with easy replaceability of the sealing strip is provided wherein the sealing strip is releasably clamped by a spring-loaded movable clamping bracket against the leading and/or rear edge of one of the adjacent troughs.

9 Claims, 2 Drawing Sheets

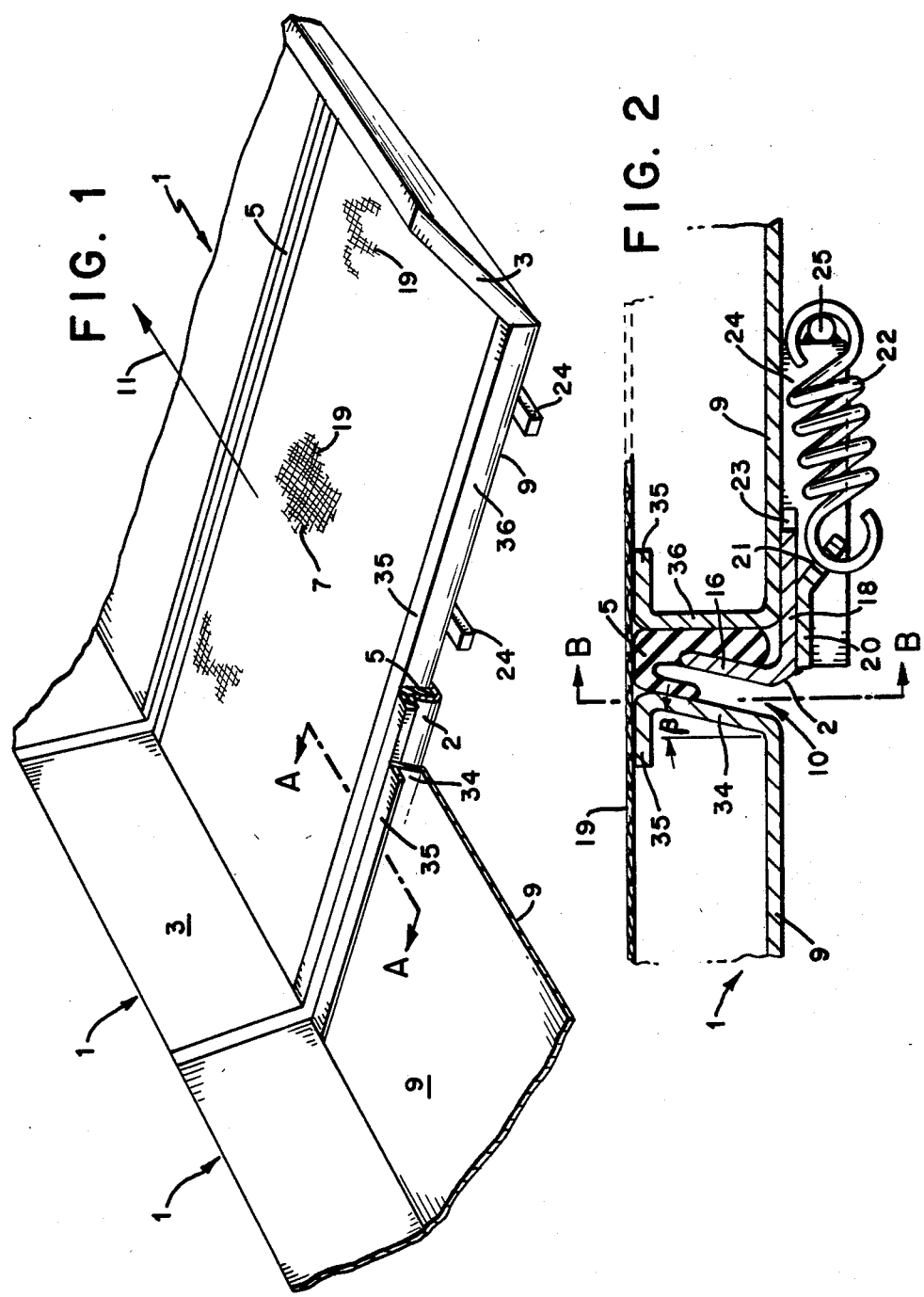

VACUUM FILTER WITH RELEASABLY CLAMPED SEALING STRIP

BACKGROUND OF THE INVENTION

The invention relates to a vacuum filter for the separation of solids from liquids, with a circulating, endless array of troughs which constitute a horizontal filter surface on which an endless filter cloth is laid, in which each trough has an elastic sealing strip on that rimless edge which extends along the trough bottom transversely to the direction of its movement.

Vacuum filters of this kind are already known, in which the conveyor revolves about longitudinally spaced wheels, wherein the upper strand of the conveyor includes a horizontal filter surface provided by a series of troughs which are preferably guided over a stationary vacuum drain. These vacuum filters are used for filtration because in this manner cake formation is promoted by gravity and the washing of the cake can be carried out more effectively.

Thus, the filtering surface of the known vacuum filter is constituted by the upper strand of the endlessly circulating array of troughs or trays which, in their direction of movement, are located directly behind each other, wherein each trough, in the direction of movement, is connected with the next adjacent trough by a sealing strip. Owing to the rimless construction of each trough, the aforementioned filter cloth can be laid over the filtration zone, that is to say, upon the filtering surface. Between the front edge of the rearward trough as viewed in the direction of movement and the rear edge of the front trough in the direction of movement a sealing strip must be located, in order to seal off the vacuum from the atmosphere. The reason for this is that each trough has its own connection with the vacuum drain located underneath and is so constructed, that the trough and the vacuum drain together form a sliding seal. The vacuum effects the drawing off of the liquid from the material residing on the filter cloth and, therefore, the seal constituted by the aforementioned sealing strip at the joint between two successive troughs must be as tight as possible.

Numerous concepts have already been advanced with regard to the known vacuum filters concerning the manner in which satisfactory cleaning and servicing including repairs can be carried out whilst maintaining proper functioning of the machine, that is to say, while separating solids from liquids. It is necessary to provide readily replaceable parts at locations in the vacuum filter apparatus subject to wear.

One part particularly subject to wear is the sealing strip located between the troughs adjacent each other in the direction of movement. The known vacuum tray-belt filters have a great number of such troughs and, for constructional reasons, between each trough there is a gap which must be flexibly sealed in order to prevent a loss of vacuum. Although the known vacuum filters have sealing strips between the troughs, it has been found that these sealing strips sometimes fail to ensure the tightness required for the vacuum applied to the filter surface and, in particular, are subjected to destructive abrasion after only a relatively short period of operation, so that the sealing function is impaired and the sealing strip has to be replaced. The replacement of these sealing strips, called tray seals, has proved difficult in conventional machines, being especially time-consuming, with the result that undesirably long down-times of the vacuum tray-belt filters occurs.

The task to which the invention is directed is therefore one of improving a vacuum filter of the type described above so as to achieve a good vacuum seal, especially between successive troughs, and with easier replaceability of the sealing strips.

SUMMARY OF THE INVENTION

In accordance with the invention, the difficulties outlined above are resolved by providing a structure in which the sealing strip is releasably clamped fast against the leading and/or rear edge of the troughs, as viewed in the direction of movement, by means of a spring-loaded, movable clamp angle member or bracket. A flexible sealing strip made of suitable elastomer material is employed and clamped by the clamp angle member on the trough edge in the gap between the troughs. The clamping does not require any slots or openings in the sealing strip, so that its function and therefore its construction can be aimed fully at the sealing effect and thereby ensure a good vacuum seal. On the other hand, the clamp mounting is releasable, so that the sealing strip is also relatively easy to replace.

The above and other objects and advantages of the present invention will appear more fully hereinafter from a consideration of the detailed description which follows taken together with the accompanying drawings wherein one embodiment of the invention is illustrated.

DESCRIPTION OF THE DRAWINGS

In the Drawings:

FIG. 1 is a perspective plan view of the filter surface including all or part of three troughs with a cutaway view of the seal structure between adjacent troughs, FIG. 2 is a fragmentary sectional view on an enlarged scale taken along line A—A of FIG. 1.

DETAILED DESCRIPTION

Figure 3:
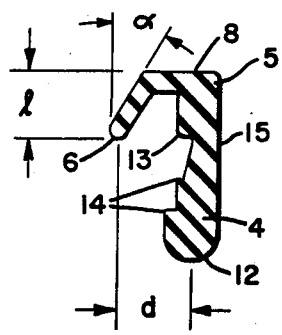
FIG. 3 is a cross-sectional profile of the sealing strip.

The sealing strip of the invention is advantageously mounted in one piece over the entire width of the trough, inclusive of the weir strips (lateral edges of the troughs) and has an approximately inverted U-shaped cross-section, wherein one arm of the U is formed as a clamp portion and the other as a sealing lip with the clamp angle member embracing only the clamp portion of the sealing strip. Therefore, in the direction of movement of the troughs, the width of the troughs is to be understood to comprise not only the width of the troughs but also the weirs or lateral edges. In the region of the filter surface, the weirs of the troughs stand preferably obliquely upwards, widening in upward direction. The sealing strip according to the invention is therefore of such length that it extends from one outer edge of the trough weir over the trough bottom and over the opposite weir to the external edge of the latter. Owing to the integral construction of the sealing strip, which covers this edge of the trough, the sealing function is particularly reliable. The above mentioned clamp angle member embraces only one portion of the U, namely the clamp portion of the sealing strip and the remaining part of the sealing strip, the sealing lip, protrudes freely from the clamp angle member and serves completely and exclusively for sealing purposes. The gap between two successive troughs is flexibly sealed by the sealing lip and the sealing strip is also adopted, after the turnover at the two trough belt filter ends, to return into the normal sealing position with sealing effect relative to the next trough.

It is also particularly advantageous if (1) the U-arm forming the clamp portion is longer than the arm forming the sealing lip, (2) the sealing lip is held apart from the clamp portion by a bridging web interconnecting the arms and, (3) the U of the sealing strip (viewed in cross-section) is open in a downward direction. The sealing strip is installed over the entire width of the trough from one weir end to the opposite weir end with the clamp portion thereof forced into the space between the clamp angle member and the adjacent edge of the trough. The sealing strip is thus releasably clamped to the trough edge while the protruding portion, which is the bridging web and the sealing lip extending away from it, serves solely and exclusively for the sealing function. Viewing the filter surface from above, the sealing lip conforms to the surface level of adjacent trough bottoms so that the area of the filtering surface on which the filter cloth is placed is an essentially flat surface with the sealing lip sealing the gap between successive troughs. By this means the vacuum of the filtering area is well maintained, with consequent reliable functioning of the vacuum filter.

In a particularly advantageous form of embodiment of the invention, the clamp portion of the sealing strip is constructed cross-sectionally as a longer arm of the U with a thickening toward the free end of the arm and terminates on the side of the bridging web on a shoulder forming a seat, wherein preferably further shoulder extensions forming a toothed profile are provided between the seat and the free end of the clamp portion and directed towards the interior of the U. Owing to the thickening of the clamp portion, which is constituted by the longer arm of the U, there results, as is apparent, a clamping and retaining function of the sealing strip not only in the direction of movement of the troughs but also perpendicularly out of the trough bottom, that is to say, when viewing the filter surface vertically to the latter in upward direction. In other words, owing to its described mode of construction, the sealing strip is reliably held in the desired position by the clamping bracket. If now the sealing strip is viewed in cross-section, then it will be seen to have, especially in the zone of the clamp portion, according to the invention a substantially flat outer surface bearing against the edge of the trough, which surface is also the outer surface of the U. The clamp portion further has the oppositely located toothed profile, which consists, for example, of two coarse teeth, formed by the aforementioned shoulder extensions. If now the profile of the clamp portion is viewed in its position on the filter surface, that is, so that the U of the sealing strip is closed at the top and open at the bottom, then the thickened section of this longer arm of the U, i.e., of the clamp portion, can be considered to be greater on the free end of the U-arm than in the region of the seat. The toothed profile is so constituted, that the outer points of the teeth are directed upwards in the direction of the bottom of the U or, respectively, the base of the teeth are directed more downwards and outwards to the free end of the long arm. Preferably two teeth are provided between the thickened end of the clamp portion and the shoulders which form the seat.

The purpose of the toothed profile is to firmly anchor the clamp portion of the sealing strip in the clamp bracket, so that during operation the sealing strip cannot move out of the filter surface either in the direction of movement of the troughs or perpendicularly thereto, for example vertically upwards out of the trough array.

The shoulder forming the seat is in that region on which the clamp portion of the U terminates. In the installed and clamped state of the sealing strip, one free supporting edge of the clamp bracket engages into this seat. The result is, that the remaining portion of the sealing strip, that is the bridging web on one hand and the sealing lip on the other, project freely out of the clamp bracket and can be used exclusively for the sealing function. Here can be recognized the advantages of the sealing strip constructed according to the invention, one portion of which serves to provide a reliable clamping action whilst its other portion (bridging web and, in particular, sealing lip) serves exclusively for sealing purposes.

It is furthermore particularly advantageous if, according to the invention, the length of the sealing lip as being the shorter arm of the U approximately equals the distance between the shoulder which forms the seat on the opposite arm and the bridging web and if, preferably, the sealing lip is arranged relative to the flat outer face of the clamp portion at an angle widening the free end of the U. Accordingly, the sealing strip according to the invention is so placed in the gap between two troughs that it is closed from above, because the U-shaped profile opens downwards. Herein, as viewed from the filter surface, a downward-extending arm is employed as clamp portion to effect clamping, while the oppositely located, likewise downward-directed shorter arm, namely the sealing lip, is employed exclusively for sealing purposes. In order to render the sealing action particularly effective, the sealing lip is positioned at the aforesaid angle in such a manner, that the U-profile of the sealing strip forms a downwardly open and widening U. The angle is preferably 10° to 40°, in particular 20° to 30°. In a very expedient, practical form of embodiment, which has already yielded good results in terms of filtration, this angle of incidence is of 25° relative to the perpendicular.

It is provided in a preferred form of embodiment, in order to assure easy replaceability of the sealing strip, that the clamping bracket have an L-shaped profile, with a clamping arm pressing against the clamp portion of the sealing strip, said arm having a bearing edge on its free end which engages into the seat of the clamp portion of the sealing strip, and further a guide arm engaging underneath the trough bottom, which guide arm is slidably held in the guiding groove of at least one sliding guide made fast under the trough bottom and/or on the outer face of the weir. The clamping arm is approximately or substantially vertically oriented to the horizontally extending filter surface pressure on the sealing strip in the region of the clamp portion of the sealing strip. The clamp portion of the sealing strip is therefore held in position parallel to the clamping arm and to the trough edge.

This clamping arm moreover has on its free end a bearing edge. The latter — as already mentioned briefly above — is the bearing edge engaging into the seat of the clamp portion of the sealing strip. The seat, which extends over the entire length of the sealing strip in the form of a shoulder, thus applies in the installed state against the bearing edge of the clamping arm, which considerably facilitates its installation, because the fitter can push the sealing strip into the space between the clamping bracket and the trough edge, until it is seated and until the external, above located outer face of the bridging web lies flush with the horizontal angled edges of the trough rims concerned. On these rims of the trough edges with the interposed sealing strips there is placed, the filter cloth. If only for the sake of completeness, let it be mentioned here that the filter cloth, in the region of the trough and within the edges thereof, is resting on a perforated plate.

The other arm of the L-shaped profile of the clamping bracket is designated as the guide arm. The latter thus engages underneath the trough bottom and is displaceable in the guiding groove of a sliding guide which is secured below the trough bottom and/or on the outer face of the corresponding weir associated with the trough. Thus, between the trough bottom below and the sliding guide above there is located the aforesaid guiding groove, in which the guide arm of the clamping bracket is slidable. This slidable configuration provides the releasable structure of the sealing strip assembly. It is apparent that if suitable traction means are provided, the clamping bracket can be drawn against the edge of the trough, thus clamping the sealing strip between this bracket and trough. On the other hand, the sealing strip becomes easily replaceable once the traction means has been released.

The traction means are provided with a retainer ring fastened to the guide arm of the clamping bracket and which is movable along the sliding guide in engagement with a traction spring releasably fastened to the sliding guide. The traction spring is thus at one end suspended in the sliding guide fixedly attached to the trough and at the other end acts on the retainer ring which in turn is fastened to the clamping bracket. As is apparent, the clamping bracket is drawn by the traction spring toward the sliding guide and thereby against the trough and the trough edge, respectively. This traction force effects the clamping.

In this arrangement it is desirable that the direction of action of the traction spring extend substantially parallel to the direction of movement of the troughs and that several sliding guides, retainer rings and traction springs be provided in spaced distribution over the width of the troughs. The gap to be sealed between two troughs has the same longitudinal shape as the sealing strip and the clamping bracket overreaches the clamp portion of the sealing strip at least over a major part thereof. In one form of embodiment, the clamping bracket can have the same length as the sealing strip and just like the sealing strip extend from one weir end over the trough bottom to the opposite weir end. In this arrangement, the clamping angle member or bracket has the same form as the cross-section of the trough, as viewed in the direction of movement of the trough. In another form of embodiment, however, the clamping bracket may have a divided structure, preferably comprising a part for the corresponding weir and a part for the trough bottom. In yet another form of embodiment, several clamping brackets can be provided for the trough bottom as well. The important feature is, however, that each clamping bracket is drawn against the trough edge by several traction means. For this reason, several sliding guides with corresponding associated parts are provided.

A further advantageous form of embodiment of the invention is characterized in that the rear edge of the leading trough as viewed in direction of movement on the filter surface extends substantially vertically from the trough bottom while the leading edge of the next following trough extends at an upwardly widening angle in upward direction relative to the bottom. The elastic properties of the sealing strip, especially upon positive contact between the sealing lip and the trough edge, are optimally exploited by the oblique edge of the adjacent trough. There is thus provided a seal which is particularly reliable.

Thus, according to the invention there is provided a very expedient, faultlessly sealing and rapidly interchangeable trough seal, so that the known vacuum trough filters having a large number of serially arranged moving troughs work reliably. The gap which, for constructional reasons, remains unavoidable between the troughs can be flexibly sealed, so that a loss of vacuum is advantageously prevented. The sealing strip according to the invention returns to its normal position even after the directional change at both ends of the belt filter, so that it can act with sealing effect relative to the next trough, when said sealing strip is fastened to the preceding trough.

The movable angle clamping member or bracket is tensioned by a number of traction springs and, in a preferred form of embodiment, the clamp arm of this clamping bracket is inwardly inclined according to the invention by at least 15°, that is to say, the two arms of the L do not extend perpendicularly to each other but form an angle of 60° to 75°. The aforesaid sliding guide then holds the clamping bracket in the desired position.

On the slide guide a suspension pin is arranged, on which the traction spring can be hooked which, with its other end, is held fast in the retainer ring. The tension of the traction spring can be easily cancelled by unhooking the traction spring from the suspension pin, so that thereafter the clamping bracket can be moved in the direction of the opposite trough. As is now well apparent, the seal can be easily replaced.

Referring to FIGS. 1 and 2, FIG. 1 shows the troughs 1 with the intervening sealing strips 5. The multiplicity of troughs 1 constitute a filter surface 7, in the plane of which the fitted filter cloth 19 is shown in FIG. 2.

The individual troughs 1 each consist of the trough bottom 9, and the weirs 3 obliquely positioned on both sides thereof. As viewed in the direction of movement 11, at the rear side of troughs 1 is located the so-called rear edge 36 of the trough 1, which is bounded above by a horizontal rim 35, in such a manner that, functionally speaking, the trough 1 can nevertheless be referred to as being substantially "rimless" because no part thereof projects above the plane of the filter cloth 19 out of the filter surface 7.

As shown in FIGS. 1 and 2, the leading or left-hand opposite edge of the following trough 1 is also bounded above by a horizontally angled rim 35.

The gap 10 (FIG. 2) between two troughs 1 is sealed by the sealing strip generally referenced 5, which is held by the cross-sectionally L-shaped clamping bracket 2 against the rear edge 36 of the leading trough 1 as viewed in the direction of movement 11.

In FIG. 1, sealing strip 5 is shown sectioned approximately centrally, as is the clamp angle member or bracket 2 holding it. It will be understood from this illustration that the sealing strip 5 extends over the entire width of the trough 1, including the weirs 3, in one piece from left to right as shown in the upper part of the drawing. The cross-sectional inverted U-form of the sealing strip 5 is shown on an enlarged scale in FIG.

3. In this can be seen the right-hand, longer arm of the U, which forms the clamp portion 4, and the opposite, other shorter arm which forms the sealing lip 6. By means of the bridging web 8, which interconnects the arms 4 and 6, the sealing lip 6 is held apart from the clamp portion 4 at a distance d, as is indicated in FIG. 3. The sealing strip is shown in all FIGS. in its sealing state, that is, in its functioning condition, as is most apparent from FIG. 2.

The clamp portion 4 of the sealing strip 5 is formed with a thickening in the direction of its free end 12. The clamp portion 4 extends between the said free end 12 and a region on the seat 13. Between this seat 13 and the free end 12 of the clamp portion 4 is located a tooth profile 14, which is oriented towards the interior of the U, that is to say, in the direction of the oppositely located sealing lip 6. The toothed profile is formed by shoulder extensions which extend along the whole of the sealing strip or along its clamp portion, respectively.

A viewing of FIG. 3 also shows, that the length of the sealing lip 6, designated 1 in the FIG., approximately equals the distance between the seat 13 and the bridging web 8. FIG. 3 also shows the smooth outer face 15, which corresponds to the flat surface of the edge 36 of trough 1. Relative to an imaginary plane formed by this smooth outer face 15 of clamping portion 4, the principal plane of the sealing lip 6 is disposed at an angle (α), which is preferably of approximately 25°.

Figure 4:
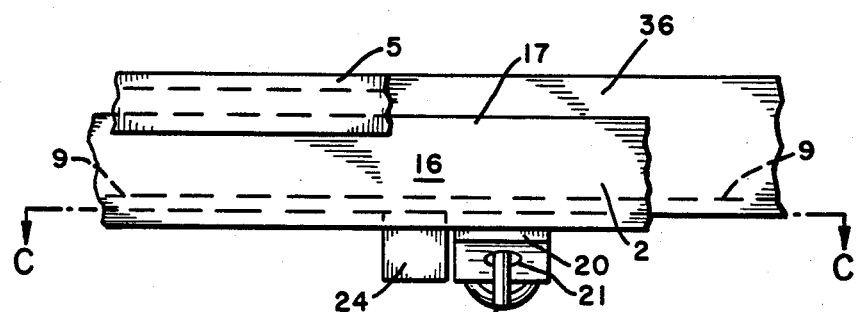
FIG. 4 is a sectional view taken along line B—B of FIG. 2.

FIG. 2 shows the cross-sectional structure of the clamp angle member or bracket 2, the profile of which is L-shaped. One arm of the L, the upper arm in FIG. 2, is referred to as clamp arm 16, which can also be seen in FIG. 4 in front elevation with its bearing edge 17 at the top, which engages into the seat 13 of the sealing strip 5.

The other arm of the L-shaped clamping bracket 2 is the guide arm 18 shown horizontally in FIG. 2. To the underside of this arm is welded a retainer ring 20, which consists of a slightly angled flat, the horizontal portion of which bears against the underside of the guide arm and the angled part of which carries the hole 21 visible in FIG. 5 for retention of the traction spring 22.

The guide arm 18 of the clamping bracket 2 is placed in a guiding groove 23 of the slide guide 24 integral with the trough bottom 9. Accordingly, the guide arm 18 can slide in the guiding groove 23 underneath the trough bottom 9 in the direction of movement 11, because the traction spring 22 has a line of action parallel to the direction of movement 11.

Figure 5:
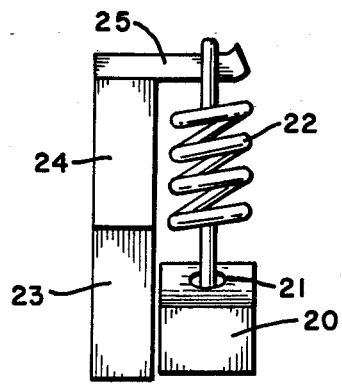
FIG. 5 is a section taken along line C—C in FIG. 4.

The slide guides 24, of which several are disposed in a spaced arrangement relative to each other at the trough bottom, preferably also outside on the weir 3 (here not shown), extend with their main direction (longitudinal axis) in the direction of movement 11. A view of FIG. 5 shows this arrangement, which extends from bottom to top in the direction of movement 11. At the upper, respectively foremost end of the slide guide 24, can be seen the retention pin 25, which is attached on one part to the slide guide 24 and on the other part forms the retaining means for the traction spring 22 in the manner also shown in FIG. 2.

In operation, the clamp arm 16 contacts sealing strip 5, arm 16 being oriented at an angle of at least 15° to the vertical, and draws the sealing strip firmly against the rear edge 36 of the leading trough 1, by the force of traction spring 22, which is supported on the retention pin 25. When the sealing strip is worn out and must be replaced, the traction spring can be unhooked from the retention pin 25, so that the clamping bracket 2 can slide in the guiding groove 23 outwards (to the left in FIG. 2). This releases the sealing strip 5, so that it can be easily removed and replaced by another one.

I claim:

1. A vacuum filter for separating solids from liquids comprising a circulating, endless array of troughs guided over a stationary vacuum drain and having lateral edges or weirs which constitute a common horizontal filter surface on which an endless filter cloth is laid, said troughs having leading and rear edges of rimless configuration which extend along the trough bottom transversely to the direction of trough movement, each said trough having an elastic sealing strip on a leading or rear edge thereof, the sealing strip being releasably clamped fast against the leading and/or rear edge of the trough by means of a spring-loaded, movable clamp angle member or bracket.

2. A vacuum filter for separating solids from liquids comprising a circulating, endless array of troughs having lateral edges or weirs which constitute a common horizontal filter surface on which an endless filter cloth is laid, in which each trough has an elastic sealing strip on the leading and/or rear edge of rimless configuration which extends along the trough bottom transversely to the direction of its movement and wherein the sealing strip is releasably clamped fast against the leading and/or rear edge of the trough by means of a spring-loaded, movable clamp angle member or bracket, said sealing strip mounted to extend in one piece over the entire width of the trough, inclusive of the weirs, and having an approximately U-shaped cross-section, with one arm of the U formed as a clamping portion and the other as a sealing lip, said clamping member or bracket surrounding only the clamping portion of said sealing strip.

3. A vacuum filter according to claim 2, characterized in that the clamping portion formed by one arm of the U is longer than the arm forming the sealing lip, that the sealing lip is held apart from the clamping portion by a bridging web which interconnects the arms and that in the sealing condition between two troughs of the filter surface the U of the sealing strip is open in downward direction.

4. A vacuum filter according to claim 3, characterized in that the clamping portion of the sealing strip constructed in cross-section as the longer arm of the U is thickened towards its free end and terminates on the other side of the bridging web on a shoulder forming a seat and that between the seat and the free end of the clamping portion there are provided further shoulder extensions directed towards the interior of the U to form a toothed profile.

5. A vacuum filter according to claim 4, characterized in that the length of the sealing lip as the shorter arm of the U of the sealing strip approximately equals the distance between the shoulder forming the seat on the opposite arm and the bridging web, and that the sealing lip is disposed relative to the smooth outer face of the clamping portion at an angle (α) widening the free end of the U.

6. A vacuum filter according to claim 5, characterized in that the clamping bracket is of L-shaped profile with one clamp arm bearing against the clamping portion of the sealing strip with a bearing edge engaging into the seat of the clamping portion of the sealing strip at its free end, and with a guide arm positioned below the trough bottom which arm is slidably held in the guide groove of at least one slide guide fastened below the trough bottom and/or on the outer face of the weir.

7. A vacuum filter according to claim 6, characterized in that a retainer ring, displaceable alongside the slide guide and fastened to the guide arm of the clamping bracket, is in engagement with a traction spring releasably fastened to the slide guide.

8. A vacuum filter according to claim 7, characterized in that the line of action of the traction spring extends substantially parallel to the direction of movement of the troughs and that several slide guides, retainer rings and tractions springs are provided in spaced arrangement relative to each other over the width of the trough.

9. A vacuum filter according to claim 8, characterized in that the the rear edge of the leading trough as viewed in the direction of movement of the filter surface projects approximately vertically upwards from the bottom of the trough, carries the sealing strip with the clamping bracket and is flush on the outside with the thereabove located outer face of the bridging web and that the leading edge of the next following trough projects upwards at an upwardly widening angle ($\beta$) relative to its bottom in such a manner, that the outer face of this edge can be pressed flat against the outer face of the sealing lip of the sealing strip.

* * * * *